(12) United States Patent
Kanai et al.

(10) Patent No.: US 6,269,857 B1
(45) Date of Patent: Aug. 7, 2001

(54) RUN-FLAT TIRE WITH SIDE-REINFORCING RUBBER PAD AND FIBROUS LAYER

(75) Inventors: Masayuki Kanai; Tomoyuki Iwagase; Yuji Miyazaki; Wuyun Guo; Rinichi Nakayama, all of Osaka (JP)

(73) Assignee: Toyo Tire & Rubber Co., Ltd., Osaka (JP)

( * ) Notice: Subject to any disclaimer, the term of this patent is extended or adjusted under 35 U.S.C. 154(b) by 0 days.

(21) Appl. No.: 09/281,181

(22) Filed: Mar. 30, 1999

(30) Foreign Application Priority Data

Aug. 4, 1998 (JP) .................................................. 10-220288

(51) Int. Cl.$^7$ ............................. B60C 15/00; B60C 17/00
(52) U.S. Cl. ............................ 152/517; 152/554; 152/555
(58) Field of Search ................................... 152/517, 554, 152/555

(56) References Cited

U.S. PATENT DOCUMENTS 5,871,600 * 2/1999 Oare et al. ........................ 152/517 X

FOREIGN PATENT DOCUMENTS

| 38 5192A1 | 9/1990 | (EP) . |
| 62-279107A | 12/1987 | (JP) . |
| 5-310013A | 11/1993 | (JP) . |

* cited by examiner

Primary Examiner—Adrienne C. Johnstone
(74) Attorney, Agent, or Firm—Jordan and Hamburg LLP

(57) ABSTRACT

A run-flat tire, i.e., a tire capable of running for a while even when it is flat or uninflated due to a puncture, includes a carcass ply or layer having a turned-up end which reaches one end of a belt layer underlying the tire tread. A crescent-shaped side-reinforcing rubber pad includes a outer-surface-side rubber pad and an inner-surface-side rubber pad arranged which sandwich a fibrous layer therebetween. The inner-surface-side pad, i.e., the one situated inward of the outer-surface-side pad, is thicker than the outer-surface-side pad. The upper end (the end close to the tread) and the lower end (the end close to a bead portion) of the fibrous layer extend slightly beyond the upper and lower ends of the side-reinforcing rubber pad, respectively.

15 Claims, 4 Drawing Sheets

EMBODIMENT

MODIFICATION 1

MODIFICATION 2

MODIFICATION 3

RUN-FLAT TIRE WITH SIDE-REINFORCING RUBBER PAD AND FIBROUS LAYER

BACKGROUND OF THE INVENTION

Background

The present invention relates to a run-flat tire, which is capable of running for some time even after the tire has become uninflated or flat.

The run-flat tire is the kind of tire that has a wall-rigidity capable of bearing the load of the vehicle until reaching the nearest service station even when the pneumatic pressure of the tire becomes insufficient or zero due to a puncture or other causes.

Various kinds of structures have been proposed for such run-flat tires. A typical run-flat tire is disclosed in JP-A-62 279107(1987) for example. This tire has a side-reinforcing rubber pad which is crescent in vertical section (a section including the tire axis) and which is attached to the inner surface of a carcass layer extending from near the upper end of a rim flange to one end of a belt layer thereby reinforcing the side wall of the tire. This side-reinforcing rubber pad which is also called a lunette gives a "self supporting capability" to an flat tire and is usually formed of a rubber layer of high rigidity.

In the tire disclosed in EP 385192A1 (1990, counterpart of JP-A-02 283508), a single fibrous layer 103 formed of a fibrous cord ply extends from one side of the tire to the opposite side of the tire, that is, from one rim-fitting portion to another rim-fitting portion at opposite end. The fibrous layer 103 is inserted into a side-reinforcing rubber pad 102 along the center of the thickness of the rubber pad 102 as shown in FIG. 6. Such fibrous layer 103 is adapted to rigidify the side-reinforcing rubber pad so that when the tire gets punctured, generation of a crack in the side-reinforcing rubber pad resulting from an excessive compressive deformation is prevented.

Further, in the structure of the tire disclosed JP-A-05310013(1993), the fibrous layer 103 is arranged on the interface between an inner liner 105 and the side-reinforcing rubber pad 102 so that the fibrous layer 103 wraps up the inner surface of the side-reinforcing rubber pad 102 as shown in FIG. 7. Thus, it is described in the specification that with such structure, the durability life (a distance for which the tire is capable of running under a rated load, hereinafter referred to as the run-flat durability) of the tire in the flat condition can be increased.

However, since the fibrous layer which is strong against a tensile force is arranged on the inner surface of the tire subject to a compressive deformation, the effect of improving the durability of the tire has not been sufficient.

Further, inview of the rigidity of the side-reinforcing rubber pad due to the provision of the fibrous layer, the ride quality or ride comfortableness becomes worse.

In addition, in order to give the tire a sufficient degree of rigidity and durability, it has been necessary for the side-reinforcing rubber pad and the fibrous layer to have sufficiently large sizes which results in increasing the weight of the tire.

SUMMARY OF THE INVENTION

The present invention has been made in view of the above-described prior art problems and an object of the invention is to provide a run-flat tire which is capable of increasing its mileage or traveling distance when flat and which can improve the ride quality of the vehicle.

A first feature of the run-flat tire according to the present invention resides in that the run-flat tire is provided with a bead portion; at least one carcass ply turned up around the bead portion; a side-reinforcing rubber pad which is crescent-shaped in section including the tire axis and which is arranged on the side of the carcass ply that is adjacent to the inner surface of the tire; and a fibrous layer for reinforcing the side-reinforcing rubber pad. The carcass ply is turned up from tire's-inner-surface side toward tire's-outer-surface side so as to wrap up the bead portion and then toward the tread with its turn-up end reaching one end of a belt layer. The side-reinforcing rubber pad comprises a tire's-outer-surface-side rubber pad and a tire's-inner-surface-side rubber pad, both of which rubber pads are laid one above another, with the fibrous layer being sandwiched therebetween, and with the tire's-inner-surface-side rubber pad having a thickness larger than that of the tire's-outer-surface-side rubber pad.

With the above-described structure, since the carcass turn-up end reaches one end of the belt layer, the tensile force for inhibiting the deformation of the side wall portion acts on the outer side of the carcass layer when the tire is uninflated so that the deformation of the tire due to a load on the tire can be restrained without increasing the rigidity of the rubber of the side wall portion. Consequently, it is possible to improve the run-flat durability without worsening the ride quality.

Further, since the fibrous layer for reinforcing the side-reinforcing rubber pad is arranged close to the outer surface of the side-reinforcing rubber pad, the compressive deformation to which the fibrous layer is subjected is mitigated, thereby improving the durability of the tire. Accordingly, the durability of the tire at the time of normal use and at the time of the tire is running flat can be increased. Further, by the arrangement of such fibrous layer, it is possible to control the manifestation of an excessive degree of rigidity at the time of minor deformation of the tire while keeping the resistance against a major deformation of the tire side wall portion, as compared to a case where the fibrous layer is arranged on the inner surface of the side-reinforcing rubber pad. Consequently, the worsening of the ride quality due to the arrangement of the fibrous layer can be mitigated.

Thus, with the structure of the first feature of the present invention, the run-flat durability of the tire can be increased and the ride quality of the tire both at the time of normal use of the tire and at the time when the tire is in the uninflated condition can be improved.

A second feature of the run-flat tire according to the present invention resides in that the upper end of the fibrous layer is located under one end of the belt layer while the lower end of the fibrous layer is located on the inner-surface side of the tire.

With the above structure, the increase of the weight of the tire due to the presence of the fibrous layer can be minimized. Further, since the stress resulting from any cause other than the deformation of the side-reinforcing rubber pad is prevented from being applied on the fibrous layer, it is possible to enhance the durability of the fibrous layer.

A third feature of the run-flat tire according to the present invention resides in that the carcass layer comprises a single ply.

With the above structure, the weight of the tire can be reduced.

A fourth feature of the run-flat tire according to the present invention resides in that the fiber cords of the fibrous layer are arranged substantially in the radial direction of the tire.

A fifth feature of the run-flat tire according to the present invention resides in that a separate carcass ply is laid over the above-described at least one carcass ply, on the tire's-outer-surface side of the side-reinforcing rubber pad, and this separate carcass ply is turned up from the tire inner surface side toward the tire outer surface side at the bead portion in such a manner that the turn-up end of the carcass ply is located within the range from the lower end to the upper end of the bead filler rubber.

With the above structure, the tire can have a sufficient degree of run-flat durability even when the tire is used for large-sized passenger cars, minivans and the like.

A sixth feature of the run-flat tire according to the present invention resides in that a separate carcass ply is provided on the tire's-inner-surface side of the side-reinforcing rubber pad; and this separate carcass ply is turned up from the tire's-inner-surface side toward tire's-outer-surface side at the bead portion in such a manner that the turn-up end of the carcass ply is located within the range from the lower end to the upper end of the bead filler rubber.

With the above structure, the tire can have a sufficient degree of run-flat durability even when the tire is used for large-sized passenger cars, minivans and the like.

A seventh feature of the run-flat tire according to the present invention resides in that the rubber material for forming the side-reinforcing rubber pad satisfies the requirements given in the following paragraphs (1) and (2), namely:

(1) The hardness (Hs) obtained by an A-shape spring hardness test of JIS (Japanese Industrial Standards) K 6301 is in the range of 70 to 85; and (2) The value of tan δ obtained by a dynamic characteristic test is in the range of 0.10 to 0.20.

An eighth feature of the run-flat tire according to the present invention resides in that the rubber material for forming the side-reinforcing rubber pad satisfies the requirements given in the following paragraphs (3) and (4):

(3) 10 to 50 percent by weight of butadiene rubber is contained in the rubber component of the tire; and (4) 100 parts by weight of the rubber component is added by 0.5 to 3 parts by weight of resorcinol or its derivative, and by hexamethylenetetramine or melamine derivative in an amount a half to two times that of resorcinol or its derivative.

DETAILED DESCRIPTION

One embodiment of the present invention will now be described with reference to FIGS. 1 and 2.

Figure 1:
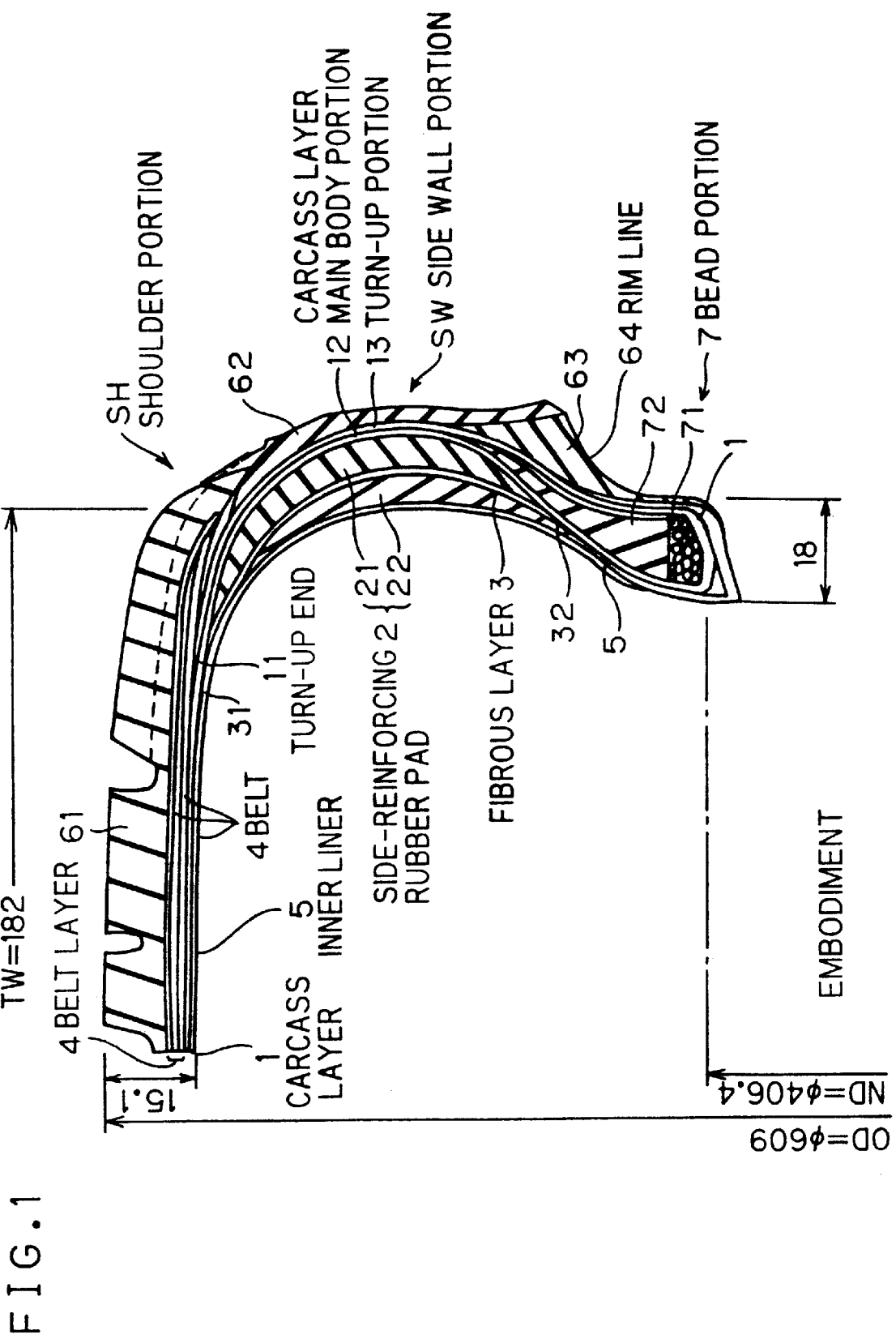
FIG. 1 shows a structure of a run-flat tire in a partial view at a vertical section including a tire axis, according to one embodiment of the present invention.
Figure 2:
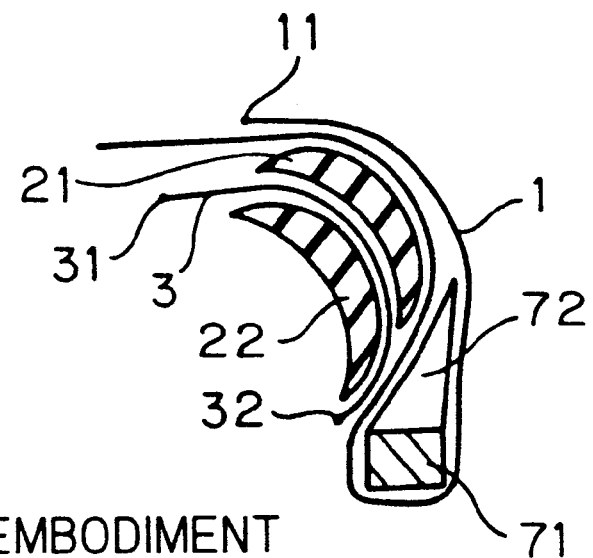
FIG. 2 is a simulative partial vertical sectional view of an essential portion of the run-flat tire shown in FIG. 1.

FIG. 1 shows a structure of a run-flat tire in a partial view at a vertical section including a tire axis, for a medium-and a small-size passenger car while FIG. 2 is a schematic view of an essential portion of the tire shown in FIG. 1. It should be noted that in the following description, a tread-ward side in the tire's radial direction is referred to as an upper side, the outer-surface side of the tire is referred to as outer or outside and the inner-surface side of the tire is referred to as inner or inside.

As shown in FIG. 1, each of both ends of a carcass layer 1 is turned up from inner side toward outer side around bead cores 71 and bead fillers 72 thereabove, at bead portions 7. Each of carcass turn-up ends 11 extends to reach one end of a belt layer 4 that is arranged over substantially the entire width TW of a tread portion. Accordingly, a turn-up portion 13 of the carcass layer 1, which extends from the bead portion 7 to the turn-up end 11, is laid over the outer surface of a main body portion 12 of the carcass layer 1, which extends between the right and left bead portions 7, with the exception of the bead portions 7. In the shown example, the carcass layer 1 comprises a single ply.

On inner side of the carcass layer 1, there is arranged a side-reinforcing rubber pad 2 over the region extending from near a rim line 64 contacting the upper end of a rim flange to one end of the belt layer 4.

The side-reinforcing rubber pad 2 comprises an outer rubber pad 21 and an inner rubber pad 22 that has a thickness a little larger than that of, and laid over, the outer rubbed pad 21 with respect to the position of the reinforcing ply, the closer the reinforcing ply is to the inner surface of the tire, the larger the compression force applied thereon resulting in lowering the durability of the tire but the closer the reinforcing ply is to the outer surface of the tire, the smaller the amount of padding rubber wrapped up by the reinforcing ply and the carcass ply, so that an increase in the rigidity of the tire by wrapping can not be expected. Accordingly, the ratio of the thickness of the outer rubber pad 21 with respect to the inner rubber pad 22 is preferably in the range of 0.9 to 0.5. Both of the outer and the inner rubber pads 21 and 22 are crescent in shape. Widths of the outer and the inner rubber pads 21 and 22, that is, the dimensions thereof in the radial direction (the dimensions taken along the surface of the tire in the sectional view of FIG. 1) are substantially equal to each other. These pads 21 and 22 are arranged a little displaced from each other to prevent the upper ends or the lower ends thereof from being situated at the same position. In the example shown, the outer reinforcing rubber pad 21 is arranged a little displaced upward of the inner reinforcing rubber pad 22.

Between the outer and inner rubber pads 21 and 22, there is clamped a fibrous layer 3 comprising a plurality of fibrous cords arranged substantially radially. Accordingly, the outer rubber pad 21 is wrapped up by the carcass layer 1 and the fibrous layer 3 so as to be prevented from becoming deformed. The upper end 31 of the fibrous layer 3 is sandwiched between the carcass layer 1 and an inner liner 5 at a portion near the upper end of the outer rubber pad 21. The lower end 32 of the fibrous layer 3 extends substantially to a position near the lower end of the inner rubber pad 22 and is sandwiched between the carcass layer 1 and the inner liner 5 or the lower end portion of the rubber pad 22 inside the bead filler 72. That is, the fibrous layer 3 comprises an independent fibrous cord layer different from the fibrous cord layer performing the function of the carcass ply or belt layer 4. The length of the fibrous layer 3 is usually equal to the length of the side-reinforcing rubber pad 2. However, when tires are to be used in strict conditions, it is possible for the fibrous layer 3 to have a length allowing it to project from the reinforcing rubber pad 2 according to necessity.

The fibrous layer 3 is made of a tire or cord fabric and the direction of arrangement of fibrous cords is within the range of of 90° to 40° with respect to the circumferential direction of the tire.

With the exception of the structural portions described above, nothing is different from the structure of the general tires for a medium or small-sized passenger cars. As shown in the drawings, a tread rubber 61 is arranged on the outer surfaces of the tread portion, a side rubber 62 is arranged on the side wall portion, and a protector rubber 63 is arranged on the bead portion 7.

With the above-described structure of the run-flat tire, the following advantages A through D can be obtained.

A. Even when the tire becomes flat, the turn-up portion 13 of the carcass layer 1 induces a tensile strength on the outer side of the main body portion 12 of the carcass layer to restrain the deformation of the side wall portion.

B. Since the carcass layer 1 is a single-ply type, the weight reduction of the tire can be realized.

C. By the arrangement of the fibrous layer 3 at a position a little outward of the center of the thickness of the side-reinforcing rubber pad 2, it is possible to minimize the compressive deformation effected on the fibrous layer 3 while preventing an excessive compressive deformation effected on the inside portion of the side-reinforcing rubber pad 2. Accordingly, the durability of the side-reinforcing rubber pad 2 and that of the fibrous layer 3 can be improved to thereby improved the durability of the tire in its entirety.

D. Due to the presence of the fibrous layer 3 only in the region where the side-reinforcing rubber pad 2 is usually arranged, the weight of the fibrous layer 3 can be minimized and accordingly, the increase in the weight of the tire can be minimized.

The rubber material for forming the side-reinforcing rubber pad 2 satisfies the requirements given in following paragraphs (1) and (2) and especially in the following paragraphs (3) and (4) additionally.

(1) The hardness (Hs) according to a JIS (Japanese Industrial Standards) K 6301 A-shape spring hardness test is within the range of between 70 and 85;

(2) The value of tan δ obtained by a dynamic characteristic test is within the range of 0.10 to 0.20.

(3) 10 to 50 percent by weight of butadiene rubber is contained in the rubber component of the side-reinforcing rubber pad 2; and (4) 100 parts by weight of the rubber component is added by 0.5 to 3 parts by weight of resorcinol or its derivative, and by hexamethylenetetramine or melamine derivative in an amount a half to two times that of resorcinol or its derivative.

When the hardness (Hs) of the rubber material is less than 70, the rigidity of the side-reinforcing rubber pad 2 is not sufficient so that the run-flat durability becomes insufficient while when the hardness (Hs) exceeds 85, the rigidity of the rubber pad becomes so high as to spoil the ride quality. When the value of tan δ is less than 0.10, the vibration absorbing function of the tire becomes insufficient to spoil the ride quality. When the value of tan δ exceeds 0.20, the generation of heat at the time of vehicle running becomes intense so that the tire tends to be damaged in a short period. It is more preferable that the hardness (Hs) of the rubber material is in the range of 75 to 80 and the value of tan δ is in the range of 0.13 to 0.15.

The characteristics given in the above paragraphs (1) and (2) can be achieved easily by selecting the compositions described in the above paragraphs (3) and (4).

By containing a proper amount of butadiene rubber in the rubber component of the tire as described in the above paragraph (3), the fatigue-resistant property of the tire improves. Where the weight percentage of butadiene rubber is less than 10 percent by weight or it exceeds 50 percent by weight, the run-flat durability of the tire goes bad. The weight percentage of butadiene rubber is more preferable when it is in the range of of 20 to 40 percent by weight, and further more preferable when it is in the range of 25 to 35 percent by weight. As a specifically preferable butadiene rubber (BR), mention is made of high-cis butadiene rubber (High-cis BR) and VCR (Vinyl Cis-polybutadiene Rubber, or 1,4-polybutadiene rubber reinforced with a fibrous material consisting of a high-crystalline syndiotactic 1,2-polybutadinene). As other preferable rubber to be contained in the rubber component of the tire, mention is made of natural rubber which generally excels in dynamic characteristic and fatigue resistant property.

Further, by containing of a suitable amount of a thermoset synthetic resin in the rubber component of the tire as described in the above paragraph(4), balance between heat generation property, that is the value of tan δ, and the hardness is easily adjusted to a suitable degree.

A concrete example (Example) of the instant embodiment will be described below.

The structure of the tire is as shown in the drawings. The outer diameter OD of the tire is 609 mm, the nominal diameter ND of the rim is 406 mm, the tread width TW is 182 mm, the thickness of the tread portion is 15.1 mm and the thickness of the tire at a portion near the bead core is 18 mm. Further, the thicknesses of the outer and inner rubber pads 21 and 22 are 4 mm and 5 mm, respectively. The width (in the radial direction) of each of these rubber pads is about 70 mm. The outer and inner rubber pads 21 and 22 are so arranged as to become displaced from each other by about 10 mm in the radial direction.

A 205/50R16 tire was used. The carcass ply of the tire was comprised of rayon of 1650 denier×2 with 24 counts/inch. The belt layer was comprised of a steel (2+2)×0.25 mm with 19 counts/inch. The belt reinforcing layer was of one cap type, that is, a sheet of 6, 6-nylon 840 denier×2 with 30 counts/inch. The fibrous layer was a sheet of rayon 1500 denier×2 with 24 counts/inch.

Further, the rubber material for forming the side-reinforcing rubber pad 2 was the one that is given in the rubber material composition 3 in Table 3 to be described later. That is, the rubber component contains 70 percent by weight % of natural rubber (NR) and 30 percent by weight of high-cis butadiene rubber (High-cis BR). To 100 parts by weight of such rubber component there were added 1 part by weight of resorcinol and 1 part by weight of hexamethylenetetramine. Further, besides these additives, 65 parts by weight of carbon black (N550), 5 parts by weight of aromatic oil, 5 parts by weight of zinc oxide, 2 parts by weight of stearic acid, 1.5 parts by weight of an anti-oxidant TMQ ("Antigene RD-G" of Sumitomo Chemical Industries Co., Ltd.), 4 parts by weight of sulfur and 1 part by weight of a vulcanization accelerator CBS (NOCCELER CZ-G of Ouchi Shinko Chemical Co., Ltd.) were added to the rubber component. The vulcanization molding was performed by heating the material for 20 minutes at a temperature of 160° C. The rubber molding obtained has a hardness of 74 and tan δ value of 0.12.

Modifications 1 to 3 will be described by referring to FIGS. 3 through 5.

Figure 3:
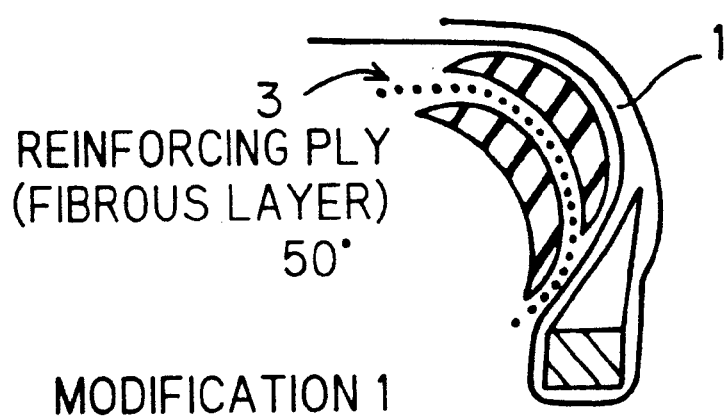
FIG. 3 is a schematic partial vertical sectional view of an essential portion of a first modification of the run-flat tire according to the present invention.

In Modification 1 shown in FIG. 3, the tire has the same sectional structure as in case of the above-described embodiment, except that the fibrous layer 3 is arranged to incline by 50 degrees with respect to the circumferential direction of the tire. In this case, although the effect of preventing the deformation of the side-reinforcing rubber pad 2 decreases, the possibility of compressive deformation of the fibrous layer 3 occuring sharply decreases and the durability of that fibrous layer 3 increases. Accordingly, such arrangement is preferable under a condition in which the load applied on the tire is comparatively small.

Figure 4:
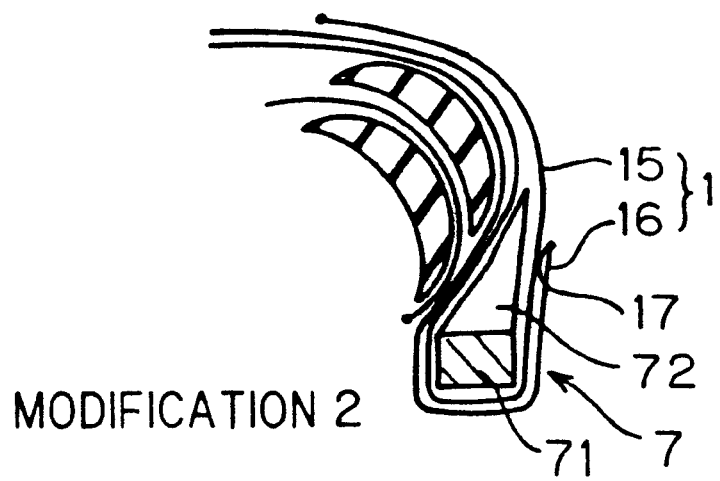
FIG. 4 is a schematic partial vertical sectional view of an essential portion of a second modification of the run-flat tire according to the present invention.

In Modification 2 shown in FIG. 4, the carcass layer 1 is two-ply type. Whereas one carcass ply 15 is the same in structure as the above-described embodiment, the other carcass ply 16 has its turn-up end 17 held stationary outside the bead portion 7. In this case, although the weight of the tire increases, the load bearing capacity of the tire improves. Therefore, such arrangement is suitable for a tire which is subjected to a comparatively large load, for example, for the tire to be used for a minivan or a truck. Where the carcass plies 15 and 16 of the carcass layer 1 are made thin, a tire having such carcass layer is suitable for medium- and small-sized general passenger cars as in the above-described embodiment.

Figure 5:
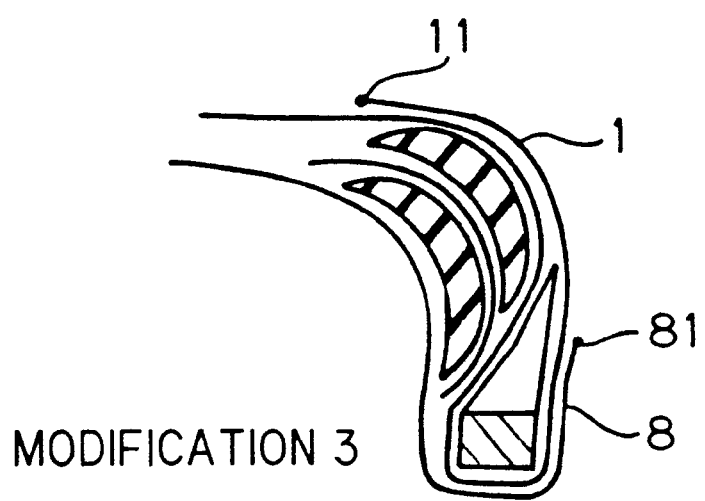
FIG. 5 is a schematic partial vertical sectional view of an essential portion of a third modification of the run-flat tire according to the present invention.
Figure 6:
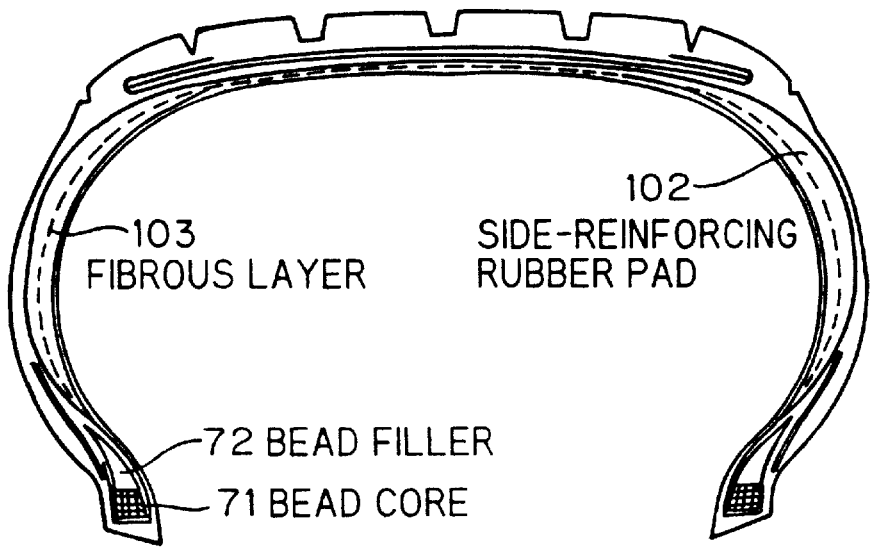
FIG. 6 is a schematic vertical sectional view of the structure of a prior art run-flat tire.

In Modification 3 shown in FIG. 5, a separate carcass ply 8 is provided along the inner liner 5, other than and in addition to the carcass ply 1 outside the side-reinforcing rubber pad 2. Turn-up ends 81 of both ends of the carcass ply 8 are held stationary outside the bead portions 7, respectively. In this case, although the weight of the tire increases, the effect of restraining the deformation of the side-reinforcing rubber pad 2 sharply increases so that the run-flat durability of the tire increases. Accordingly, as in modification 2, such an arrangement may become a very preferably mode of carrying out the invention depending on the kind of use of the tire.

Figure 7:
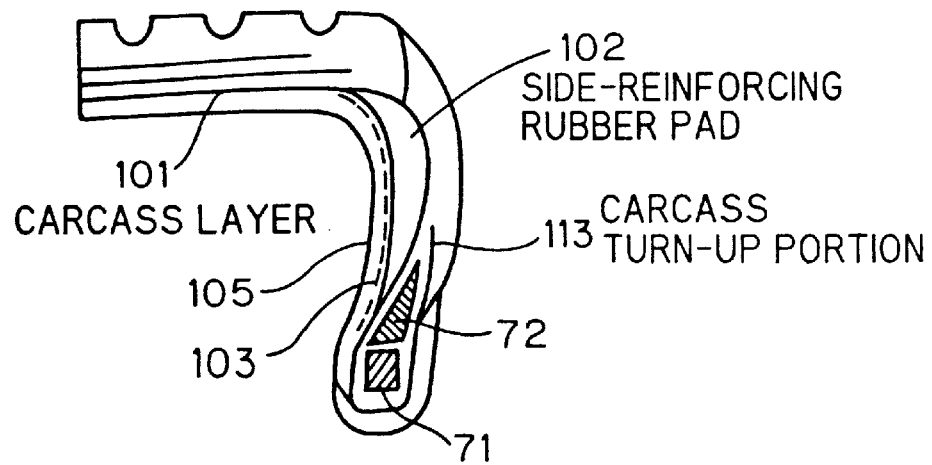
FIG. 7 is a schematic vertical sectional view of another prior art run-flat tire.

In the following table 1 there are shown test results regarding the Example, the Modification 2 and Comparative examples 1 to 3. The construction of each tires used for the test, such as the dimensional structure and the composition of the material for forming the side-reinforcing rubber pad 2, are the same as those of the Example unless otherwise specified. Further, the comparative example 1 described below corresponds to a prior art tire shown in FIG. 7 of EP 385192 A1.

TABLE 1

Comparison among Example, Modification and Comparative examples of Tires regarding their Sectional Structures

|  | Example | Modification 2 | Comparative example 1 | Comparative example 2 | Comparative example 3 |
|---|---|---|---|---|---|
|  | Carcass 1 ply | Carcass 2 plies | The fibrous layer inside the side-reinforcing rubber pad | No fibrous layer | General type having no side-reinforcing rubber pad |
| Pneumatic pressure: 0 kpa |  |  |  |  |  |
| Durability | 150 | 175 | 100 | 50 | 0 |
| Ride quality | 80 | 50 | 50 | 70 | unable to evaluate |
| Steering stability | No practical problem | No practical problem | Practical problem | Practical problem | unable to evaluate |
| Pneumatic pressure: 200 kPa |  |  |  |  |  |
| Ride quality | 80 | 50 | 50 | 70 | 100 |
| Weight of tire | 100 | 103 | 100 | 100 |  |

Durability: Mileage of a tire until rupture, on a drum running at a speed of 80 km/hr under a pneumatic pressure of 0, is shown by an index when the comparative example 1 was assumed to have an index of 100.

Ride quality: A result of a sensual test by a driver is shown by an index, when the evaluation of a general tire at the rated pneumatic pressure is taken as a reference value (with an index of 100).

Steering stability: In the same manner with the evaluation of ride quality, the ease of steering at the time of cornering was evaluated.

Weight of tire: The weight of tested tire relative to the weight (as a reference value 100) of a tire of the type in which the fibrous layer extends along the inner liner (Comparative example 1).

The durability test was performed under 85% of a rated load. For the sensual test on ride quality, a FF type passenger car of 1800 cc engine displacement was used.

As will be seen from the test results shown in the table 1, the run-flat tire according to the embodiment of the present invention excels outstandingly in its run-flat durability and its ride quality at the time of run-flat and normal driving as compared to the run-flat tire of the comparative example 1, that is disclosed in EP 385192 A1. Further, it also excels in its steering stability at the time of run-flat driving. Nevertheless, the weight of the tire is the same as that of the tire of the comparative example 1.

In the above table 1, although the modification 2 is evaluated as being inferior to the other tires in the ride quality, such evaluation is based on the fact that the tire in question having a rigidity and a load capacity higher than those of a 1800 cc type passenger car tire was mounted in that type of passenger car and was compared to the general tire for that passenger car.

Next, a result of evaluation of the run-flat durability of a tire having the same structure as the embodiment of the present invention in a situation where the composition of the rubber material for forming the side-reinforcing rubber pad 2 was varied in a variety of ways was shown in the table 2 together with the hardness (Hs) of the rubber material and the value of tan δ. Besides the components shown in the following table 2, 5 parts by weight of aromatic oil, 5 parts by weight of zinc oxide, 2 parts by weight of stearic acid, 1.5 parts by weight of an antioxidant TMQ ("Antigene RD-G" of Sumitomo Chemical Industries Co., Ltd.), 4 parts by weight of sulfur and 1 part by weight of a vulcanization accelerator CBS (NOCCELER CZ-G of Ouchi Shinko Chemical Co., Ltd.) were added to the rubber component of the tire as for the table 1. The vulcanization molding conditions were the same as for the table 1 (heating for 20 minutes at 160° C.).

TABLE 2

Embodiment regarding the Composition of Rubber Material for forming Side Reinforcing Rubber Pad

| Composition of Rubber material | 1 | 2 | 3 | 4 | 5 | 6 | 7 | 8 | 9 | 10 |
|---|---|---|---|---|---|---|---|---|---|---|
| Composition Rubber Components | | | | | | | | | | |
| Natural rubber (NR) | 90 | 70 | 70 | 70 | 70 | 70 | 70 | 70 | 70 | 50 |
| High-cis BR | 10 | 30 | 30 | 30 | 30 | 30 | 30 | 30 | 0 | 50 |
| VCR | 0 | 0 | 0 | 0 | 0 | 0 | 0 | 0 | 30 | 0 |
| Carbon Black N550 | 65 | 65 | 65 | 65 | 75 | 65 | 60 | 55 | 60 | 65 |
| Resorcinol | 1 | 1 | 1 | 1 | 1 | 2 | 3 | 1 | 1 | 1 |
| Hexamethylenetetramine | 0.5 | 0.5 | 1 | 2 | 0.5 | 1 | 1.5 | 0.5 | 0.5 | 0.5 |
| Hardness (Hs) of rubber | 74 | 73 | 76 | 77 | 76 | 80 | 85 | 70 | 75 | 73 |
| Tan δ | 0.12 | 0.14 | 0.13 | 0.13 | 0.20 | 0.12 | 0.11 | 0.11 | 0.12 | 0.15 |
| Durability | 105 | 115 | 120 | 104 | 104 | 130 | 137 | 103 | 117 | 105 |

High-cis BR: High-cis containing butadinene rubber
VCR: Vinyl Cis-polybutadiene Rubber, 1.4 polybutadiene rubber reinforced with fibrous materials consisting of high crystalline syndiotactic 1,2 polybutadiene.
Tan δ: A visco-elastic spectometer manufactured by Iwamoto Seisakusho Co., Ltd. was used. The measuring temperature was 30° C., the initial distortion was 10%, the dynamic distorsion was 1% and the frequency was 50 Hz.
Durability: Mileage of a tire until rupture, on a drum running at a speed of 800 km/hr under a pneumatic pressure of 0, is shown by an index when a tire having Composition of rubber material 1 (natural rubber 100%) was assumed to have an index of 100.

TABLE 3

Comparative example regarding the Composition of Rubber Material for Side Reinforcing Rubber Pad

| Composition of Rubber Material | 1 | 2 | 3 | 4 | 5 |
|---|---|---|---|---|---|
| Composition Rubber component | | | | | |
| Natural rubber | 100 | 40 | 70 | 70 | 70 |
| High-cis BR | 0 | 60 | 30 | 30 | 30 |
| Carbon Black N550 | 65 | 65 | 70 | 80 | 55 |
| Resorcinol | 1 | 1 | 0 | 2 | 4 |
| Hexamethylenetetramine | 0.5 | 0.5 | 0 | 1 | 2 |
| Hardness of rubber (Hs) | 74 | 72 | 68 | 83 | 87 |
| Tan δ | 0.12 | 0.17 | 0.17 | 0.22 | 0.08 |
| Durability | 100 | 97 | 90 | 83 | 94 |

Tan δ and durability: Same as those in Table 2.

As will be clear from the results shown in the tables 2 and 3, when the amount of addition of carbon black is within the normal range, that is, in the range of 55 to 70 parts by weight, preferably in the range of 60 to 65 parts by weight, if the composition of the rubber material for forming the side-reinforcing rubber pad 2 satisfies the requirements of the above paragraphs (3) and (4), the physical properties described in the above paragraphs (1) and (2) can be obtained with ease and an excellent flat-run durability of the tire is obtained. Further, as a result of comparison of the above-described tires with respect to their run-flat durability, it has been found that the run-flat durability is particularly excellent when the rubber component consists of 30 percent by weight of butadiene rubber with the addition of 1 through 3 parts by weight of resorcinol and hexamethylenetetramine in an amount 0.5–1 times the amount resorcinol (see the rubber material compositions 3, 6 and in the Table 2).

What is claimed is:

1. A run-flat tire comprising:
   a tread;
   a belt layer underlying the tread;
   a bead portion;
   at least one carcass ply folded at a periphery of said bead portion, said at least one carcass ply being turned up from an inner-surface side of the tire toward an outer-surface side of the tire so as to wrap said bead portion and being further turned up toward said tread with a turned-up end of said at least one carcass ply reaching one end of said belt layer;
   a crescent-shaped side-reinforcing rubber pad arranged on an inner-surface side of said at least one carcass ply to reinforce a side wall of the tire; and
   a fibrous layer for reinforcing said side-reinforcing rubber pad;
   said side-reinforcing rubber pad comprising a first outer-surface side rubber pad and a second inner-surface side rubber pad which are arranged so as to sandwich said fibrous layer therebetween, said first rubber pad being situated closer to the outer-surface side of the tire than said second rubber pad, said second rubber pad having a greater thickness than said first rubber pad.

2. The run-flat tire according to claim 1, wherein the ratio of the thickness of said first rubber pad to the thickness of said second rubber pad is in a range of 0.9 to 0.5.

3. The run-flat tire according to claim 1, wherein said fibrous layer comprises a plurality of fiber cords arranged substantially in a radial direction of the tire.

4. The run-flat tire according to claim 1, wherein an upper end of said fibrous layer is located below one end of said belt layer and a lower end of said fibrous layer is located on an inner-surface side of said bead portion.

5. The run-flat tire according to claim 4, wherein said fibrous layer comprises a plurality of fiber cords which are oriented in a direction in a range of 90° to 40° with respect to a circumferential direction of the tire.

6. The run-flat tire according to any one of claims 1 to 4, wherein said at least one carcass ply consists of a single ply.

7. The run-flat tire according to any one of claims 1 to 4, wherein a separate carcass ply is laid over said at least one carcass ply, at an outer-surface side of said side-reinforcing rubber pad; said separate carcass ply being turned up at said bead portion from the inner-surface side of the tire toward the outer-surface side of the tire in such a manner that a turn-up end of said separate carcass ply is located within the range from a lower end to an upper end of a bead filler rubber.

8. The run-flat tire according to any one of claims 1 to 4, wherein a separate carcass ply different from said at least one carcass ply is provided on an inner-surface side of said side-reinforcing rubber pad; said separate carcass ply being turned up at said bead portion from the inner-surface side of the tire toward the outer-surface side of the tire in such a manner that a turn-up end of said separate carcass ply is located within the range from a lower end to an upper end of a bead filler rubber.

9. The run-flat tire according to claim 1, wherein said side-reinforcing rubber pad is made from a material which satisfies the following requirements ((1) and (2)):

(1) JIS-A hardness (Hs) is in the range of 70 to 85; and
   (2) a value of tan δ obtained by a dynamic characteristic test at a temperature of 30° C., an initial distortion of 10%, a dynamic distortion of 1%, and a frequency of 50 Hz is in the range of 0.10 to 0.20.

10. The run-flat tire according to claim 9, wherein the rubber material of said side-reinforcing rubber pad satisfies the following requirements (3) and (4):

(3) 10 to 50 percent by weight of butadiene rubber is contained in a rubber component of the rubber material; and
   (4) 100 parts by weight of the rubber component is mixed with 0.5 to 3 parts by weight of resorcinol or its derivative, and by hexamethylenetetramine or melamine derivative in an amount of half to two times that of resorcinol or its derivative.

11. The run-flat tire according to claim 1, wherein said at least one carcass ply comprises a main portion extending at least from a position underlying said tread to said bead portion and a turned-up portion extending from said bead portion to said belt layer underlying said tread, said turned-up portion being arranged over an outer surface of said main body portion between said bead portion and said tread.

12. The run-flat tire according to claim 1, further comprising a rubber section defining a rim line, said side-reinforcing rubber pad being arranged to extend substantially between said rim line and said belt layer.

13. The run-flat tire according to claim 1, wherein a width of said first rubber pad and a width of said second rubber pad are substantially equal.

14. The run-flat tire according to claim 1, wherein said first and second rubber pads are displaced from one another such that upper ends of said first and second rubber pads do not lie at a common position and lower ends of said first and second rubber pads do not lie at a common position.

15. The run-flat tire according to claim 1, further comprising an inner liner arranged on an inner surface of said second rubber pad.

* * * * *